US005525183A

United States Patent [19]

Baley

[11] Patent Number: 5,525,183
[45] Date of Patent: Jun. 11, 1996

[54] METHOD AND APPARATUS FOR RECONDITIONING AND RESEALING A TONER CARTRIDGE

[75] Inventor: Raymond Baley, Apopka, Fla.

[73] Assignee: Bay-Bro Corporation, Longwood, Fla.

[21] Appl. No.: 305,247

[22] Filed: Sep. 13, 1994

Related U.S. Application Data

[63] Continuation-in-part of Ser. No. 83,348, Jun. 28, 1993, Pat. No. 5,407,518, which is a continuation-in-part of Ser. No. 825,850, Jan. 27, 1992, Pat. No. 5,223,068.

[51] Int. Cl.[6] .......... B32B 31/00

[52] U.S. Cl. .......... 156/344; 156/94; 156/250; 355/260; 141/364; 222/DIG. 1

[58] Field of Search .......... 156/94, 250, 257, 156/344, 510, 584; 83/703, 704, 869, 876, 885; 29/402.02, 402.03; 264/36; 355/245, 260; 141/18, 364; 222/DIG. 1

[56] References Cited

U.S. PATENT DOCUMENTS

| | | | |
|---|---|---|---|
| 780,891 | 1/1905 | Kistler . | |
| 1,928,811 | 10/1933 | Burns | 80/11 |
| 2,145,568 | 1/1939 | Faber | 143/8 |
| 3,736,829 | 5/1973 | Pedi | 83/788 |
| 4,062,385 | 12/1977 | Katusha et al. | 141/89 |
| 4,538,651 | 9/1985 | Lykins | 141/1 |
| 4,778,086 | 10/1988 | Shibata et al. | 222/325 |
| 4,816,877 | 3/1989 | Keen | 355/133 |
| 4,862,210 | 8/1989 | Woolley | 365/245 |
| 4,924,920 | 5/1990 | Bhagwat | 141/98 |
| 4,955,124 | 9/1990 | Asbery | 29/426.4 |
| 4,961,450 | 10/1990 | Furuta | 141/364 |
| 4,997,323 | 3/1991 | Giandalia et al. | 409/132 |
| 5,030,998 | 7/1991 | Shibata et al. | 355/260 |
| 5,053,816 | 10/1991 | Takahashi | 355/208 |
| 5,065,195 | 11/1991 | Haneda et al. | 355/298 |
| 5,075,728 | 12/1991 | Kobayashi et al. | 355/260 |
| 5,080,745 | 1/1992 | Paull | 156/247 |
| 5,101,871 | 4/1992 | Susumu | 141/364 |
| 5,110,646 | 5/1992 | Prestel et al. | 428/43 |
| 5,134,960 | 8/1992 | Shirai | 118/653 |
| 5,150,807 | 9/1992 | Seyfried et al. | 220/359 |
| 5,184,182 | 2/1993 | Michlin | 355/260 |
| 5,229,824 | 7/1993 | Tsusaka et al. | 355/260 |
| 5,235,130 | 8/1993 | Demoto et al. | 355/245 X |
| 5,258,814 | 11/1993 | Davies | 355/245 |
| 5,267,003 | 11/1993 | Grappiolo | 355/260 |
| 5,282,003 | 1/1994 | Michlin | 355/260 |
| 5,296,902 | 3/1994 | Michlin | 355/260 |
| 5,392,963 | 2/1995 | Kelly et al. | 355/260 X |

*Primary Examiner*—David A. Simmons
*Assistant Examiner*—Paul M. Rivard
*Attorney, Agent, or Firm*—Wallenstein & Wagner, Ltd.

[57] ABSTRACT

The present invention is a method and apparatus for reconditioning and resealing toner cartridges.

The method generally comprises the following steps: a) providing a used toner cartridge having a hopper, a mounting member and spacers interposed therebetween, b) separating the toner hopper and mounting member by cutting the spacers, and c) securing a new seal assembly between said toner hopper and mounting member to seal the toner discharge opening. The invention includes a device for separating a toner hopper from a mounting member so that the cartridge can be reliably resealed and refilled with toner for repeated use. A container holds the cartridge while leaving the outer edge of each of the spacers exposed. In one embodiment, the container is provided with wheels that travel in a track. The container moves linearly along the track past a blade that cuts through the outer edge of the spacers. In a second embodiment, the container is positioned on a rail aligned to pass between two spaced-apart blades. The rail is mounted on a linear bearing so that the rail moves linearly past the blades to cut through both of the outer edges of the spacers in a single pass. This allows the hopper to be separated from the mounting member. Finally, a vacuum system is provided for removing waste debris.

14 Claims, 11 Drawing Sheets

FIG. 14
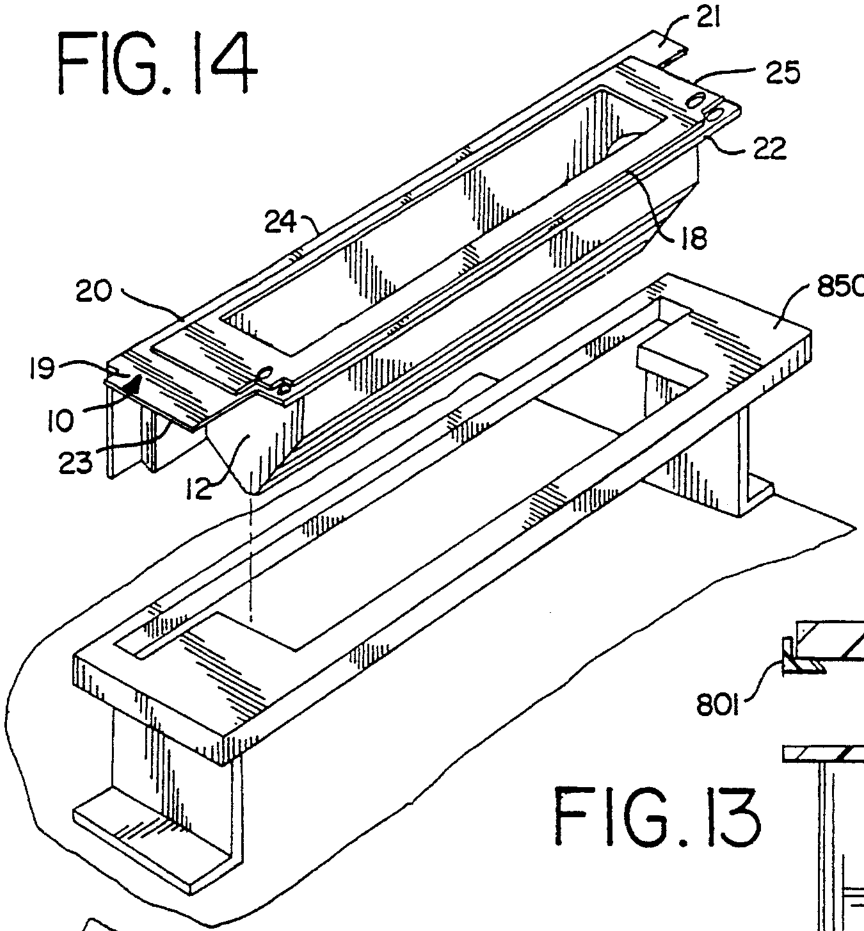
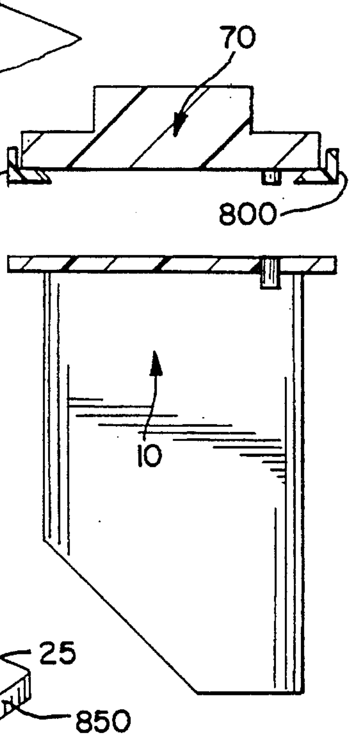
FIG. 13
FIG. 15
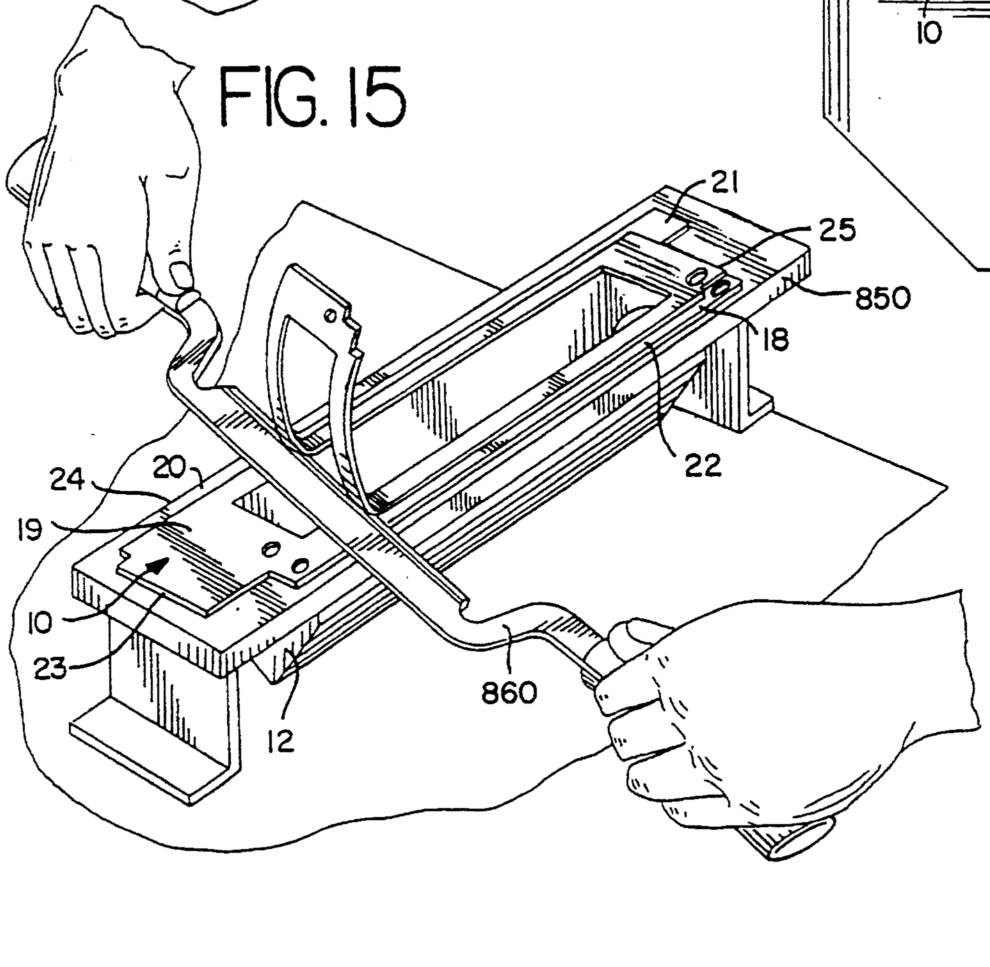

METHOD AND APPARATUS FOR RECONDITIONING AND RESEALING A TONER CARTRIDGE

DESCRIPTION

This is a continuation-in-part of application Ser. No. 08/083,348, filed Jun. 28, 1993, now U.S. Pat. No. 5,407,518, which is a continuation-in-part of application Ser. No. 07/825,850 filed on Jan. 27, 1992, now U.S. Pat. No. 5,223,068.

1. Technical Field

The present invention relates to the field of image forming devices, and more specifically to a method and apparatus for reconditioning and resealing toner cartridges for printing and copying machines and the like.

2. Background Prior Art

Many image forming apparatus utilize the xerographic printing process, examples being laser printers, copy machines, micrographic printers and facsimile machines. These image forming apparatus use toner to print or copy the desired image or words onto a piece of paper. The toner is contained in a hopper which must be refilled periodically. For example, the toner in a laser printer must be refilled after printing approximately 3000 pages.

The process of refilling the toner hopper has proven to be difficult and messy. Toner, the "ink" of the print or copy machine, is a powdery substance that must be applied evenly across the surface of a drum during use. However, toner that leaks out of the hopper during shipping can accumulate on the drum and cause blotching, streaking or voiding of prints and copies. Toner leakage can also cause moving parts to wear out more rapidly and can even short out the electrical components in the cartridge. In these ways, toner leakage reduces the quality of prints and copies, increases maintenance costs, and can even decrease the useful life of the image forming machine.

To resolve the problems associated with toner leakage, Canon and Hewlett Packard developed a disposable toner cartridge. This cartridge typically includes a toner hopper, a seal assembly, a mounting member, a magnetic roller assembly, a drum assembly and a corona assembly. By combining these components into a single cartridge, toner is applied evenly across the surface of the drum without leaking out of the hopper during shipping. Unfortunately, this cartridge design is relatively expensive. In addition, the magnetic roller, drum and corona assemblies last considerably longer than 3000 pages. Thus, the disposal of the entire cartridge results in unnecessary waste of material and landfill space—the costs being passed on to the consumers.

Toner leakage is prevented by the seal assembly which is typically provided with a removable seal member. Once this seal member is removed, toner is allowed to flow out of the toner hopper discharge opening and across the surface of the drum. Removal of the seal member also allows toner to permeate throughout the entire cartridge if shaken or flipped upside down. Consequently, the seal member is usually not removed until after the cartridge has been inserted into an image forming machine. Replacement of the removable seal member is essential if the cartridge is to be refilled and reused.

The problem of replacing the removable seal member is that the toner hopper discharge opening is obstructed by the mounting member. In fact, the mounting member is typically welded directly to the periphery of the toner discharge opening. Breaking the welds and inserting a replacement seal is an extremely difficult and labor intensive process. The hopper and mounting member are typically plastic, and not easily separated, given the strength of the welds. Great care must be taken not to damage the hopper and mounting members. This additional labor can increase the cost of a resealed cartridge above that of an original cartridge. A successful method of reconditioning and resealing many types of toner cartridges is disclosed in U.S. Pat. No. 5,223,068, owned by the assignee of the present invention.

More recently, Hewlett Packard and Cannon began producing what is commonly known as the Series 4 toner cartridge assembly. Series 4 cartridges differ from predecessor cartridges because they do not contain flexible type gaskets interposed between a toner hopper and a mounting member. Rather, generally inflexible spacers are integral with the hopper, while the mounting member is ultrasonically welded to the spacers. The present invention has been designed to recondition and reseal Series 4 type toner cartridges and the like.

SUMMARY OF THE INVENTION

The present invention is a method and apparatus for reconditioning and resealing toner cartridges.

The method generally comprises the following steps: a) providing a used toner cartridge having a hopper, a mounting member and spacers interposed therebetween, b) separating the toner hopper and mounting member by cutting the spacers, and c) securing a new seal assembly between said toner hopper and mounting member to seal the toner discharge opening.

The invention includes a device for separating a toner hopper from a mounting member so that the cartridge can be reliably resealed and refilled with toner for repeated use. A container holds the cartridge while leaving the outer edge of each spacer exposed. In one embodiment, the container is provided with wheels that travel in a track. The container moves linearly along the track past a blade that cuts through the outer edge of each spacer. In a second embodiment, the container is positioned on a rail aligned to pass between two spaced-apart blades. The rail is mounted on a linear bearing so that the rail moves linearly past the blades to cut through the outer edges of both spacers in a single pass. This allows the hopper to be separated from the mounting member.

The main advantage of the present reconditioned and resealed cartridge is its reliable, leak-free seal formed over the toner hopper discharge opening. This seal prevents toner from leaking out of the hopper and accumulating on the drum or its moving parts during shipping and handling. By providing a more reliable seal, the present invention advances the use of refilled toner cartridges and the production of clear quality prints and copies. The present invention also minimizes wear of parts and shorting out of electrical components, thereby reducing maintenance costs, increasing the useful life of the cartridge and image forming machine, and eliminating unnecessary waste of materials.

Other features and advantages of the invention will be apparent from the following specification taken in conjunction with the following drawings.

BRIEF DESCRIPTION OF THE DRAWINGS

FIG. 13 is a schematic representation of an exploded view of a separated Series 4 toner hopper subassembly;

FIG. 14 is an exploded view of a hopper placed in a holding container;

FIG. 15 is a perspective view of an operator using a hand held plane to cut the widthwise hopper-gasket seals;

DETAILED DESCRIPTION

Figure 1:
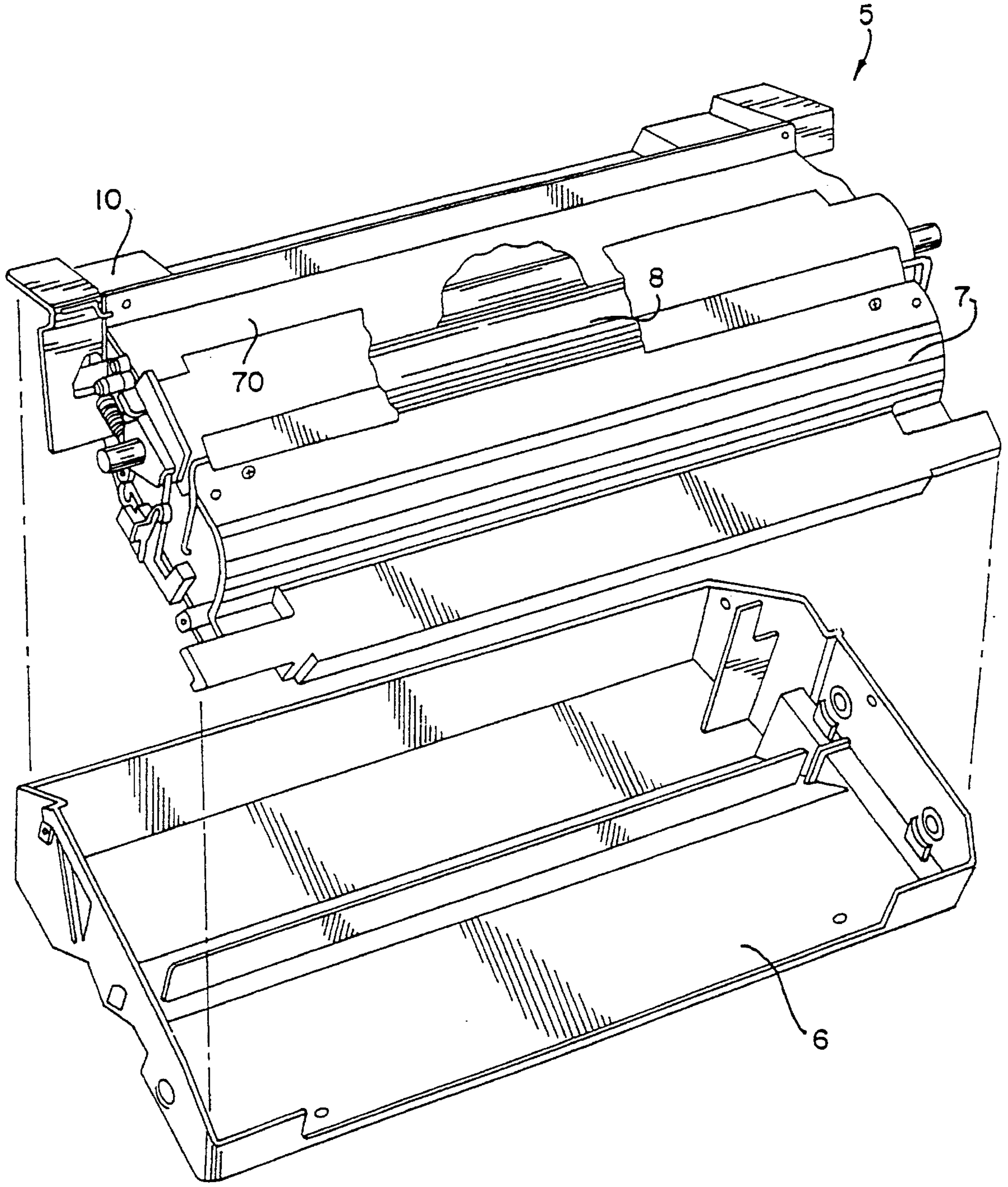
FIG. 1 is an exploded, cut-away view of a toner cartridge.

While the disclosed inventions are susceptible of embodiments in many different forms, there is shown in the drawings and will herein be described in detail, preferred embodiments of the inventions with the understanding that the present disclosure is to be considered as an exemplification of the principles of the inventions and is not intended to limit the broad aspects of the inventions to the embodiments illustrated.

Figure 2:
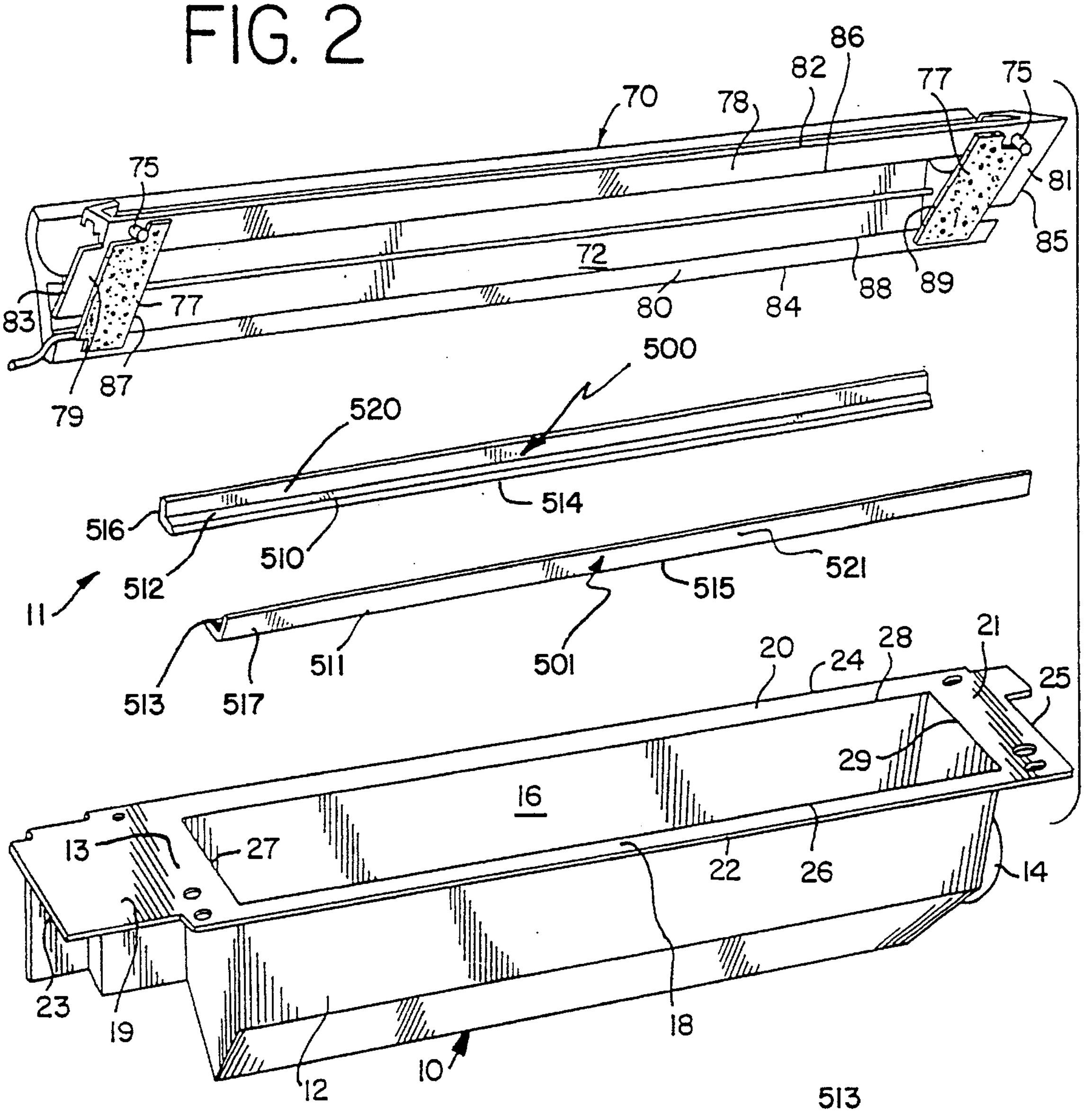
FIG. 2 is an exploded view of a Series 4 type toner cartridge subassembly.
Figure 3:
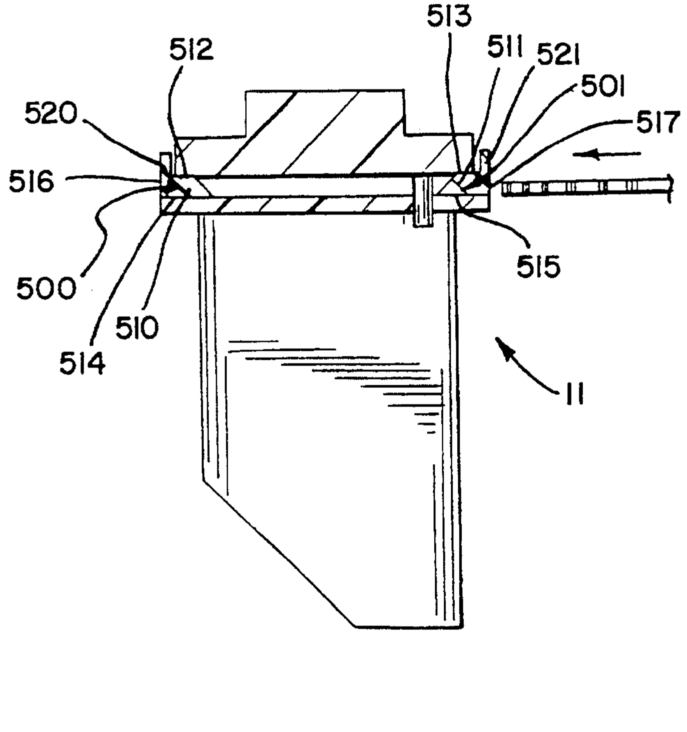
FIG. 3 is a schematic representation of a front elevational view of a Series 4 type toner cartridge subassembly and a saw blade.

A typical used cartridge 5 is shown in FIG. 1. This cartridge is generally comprised of a shell 6, a waste toner bin 7, a drum assembly 8, a toner hopper 10 and a mounting member 70. The cartridge 5 can be disassembled until only the toner cartridge subassembly 11 remains, as shown in FIGS. 2 and 3. The toner cartridge subassembly 11 is comprised of a hopper 10, L-shaped legs 500, 501 and a mounting member 70.

Toner hopper 10 has a hollow bin 12, a toner refill opening 14 and a toner discharge opening 16. The discharge opening 16 is defined by peripheral portions 18–21. The peripheral portions 18–21 lie in the same plane and define the top 13 of the toner hopper 10. The toner hopper 10 also has hopper lengthwise outer edges 22 and 24, hopper widthwise outer edges 23 and 25, and hopper inner edges 26–29.

As shown in FIGS. 2 and 3, L-shaped legs 500, 501 have spacers 510, 511 and integral lips 520, 521. The spacers 510, 511 have top portions 512, 513, bottom portions 514, 515 and outer edges 516, 517. The bottom portions 514, 515 of the spacers 510, 511 are integral with the lengthwise toner hopper peripheral portions 20, 18, respectively. It is believed that the lips 520, 521 act as locators or guides during assembly of a new toner cartridge.

Mounting member 70 has peripheral portions 7881 which define mounting member opening 72. Lengthwise peripheral portions 78, 80 are ultrasonically welded to the top portions 513, 512 of spacers 511, 510, respectively.

Prior to installation and use, original subassembly 11 has a removable seal member (not shown) placed over toner discharge opening 16. Attached in this way, the removable seal member prevents toner from passing through toner discharge opening 16 until cartridge 5 is installed and the seal member is removed. Mounting member 70 also has lengthwise outer edges 82 and 84, widthwise outer edges 81 and 83, and inner edges 86, 87, 88 and 89.

No welds are provided between hopper peripheral portions 19, 21 and mounting member peripheral portions 79 and 81. Instead, seals 77 are attached to mounting member peripheral portions 79 and 81 to prevent toner from leaking after the seal member has been removed. It should be understood that although ultrasonic welds are typically used to join original subassembly 11 together, the following method is applicable where heat welds, glues, adhesives, resins or other similar means of securing are used.

The method of reconditioning and resealing a used cartridge will be described below in connection with two embodiments of a separating device and two types of seal assemblies.

The method requires one to disassemble the used cartridge 5 until only subassembly 11 remains. Removal of the other components facilitates handling during the reconditioning and resealing process and prevents inadvertent damage to the components.

Figure 4:
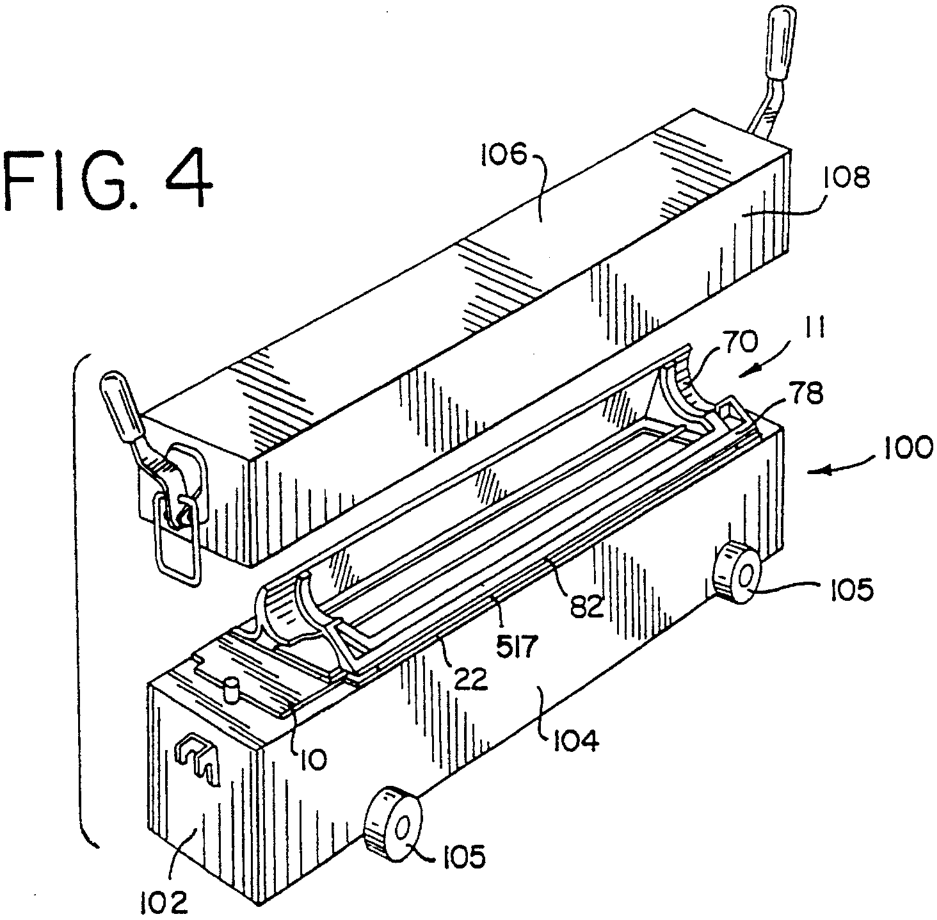
FIG. 4 is a perspective view of a used cartridge subassembly being placed into a cart.
Figure 7:
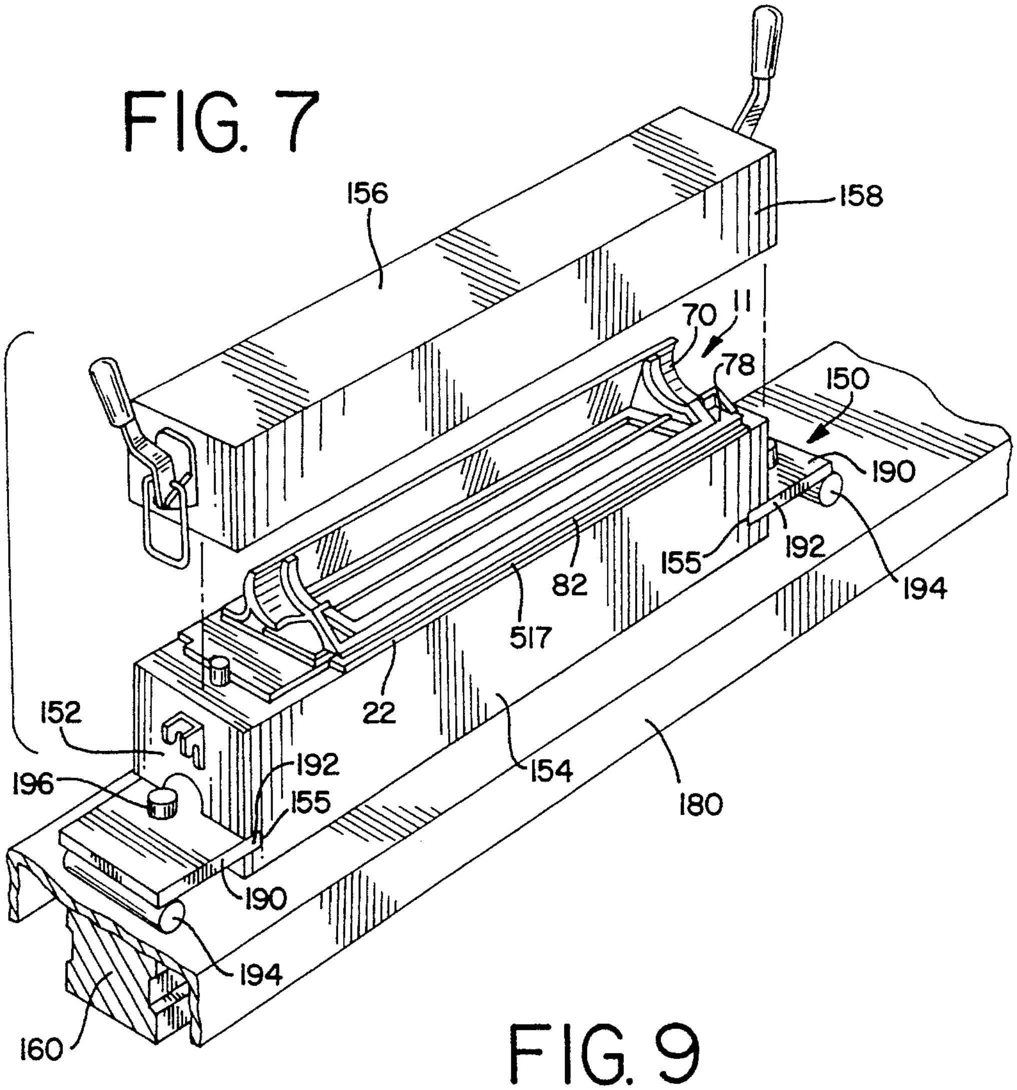
FIG. 7 is a perspective view of a cartridge subassembly being placed in a container.
Figure 9:
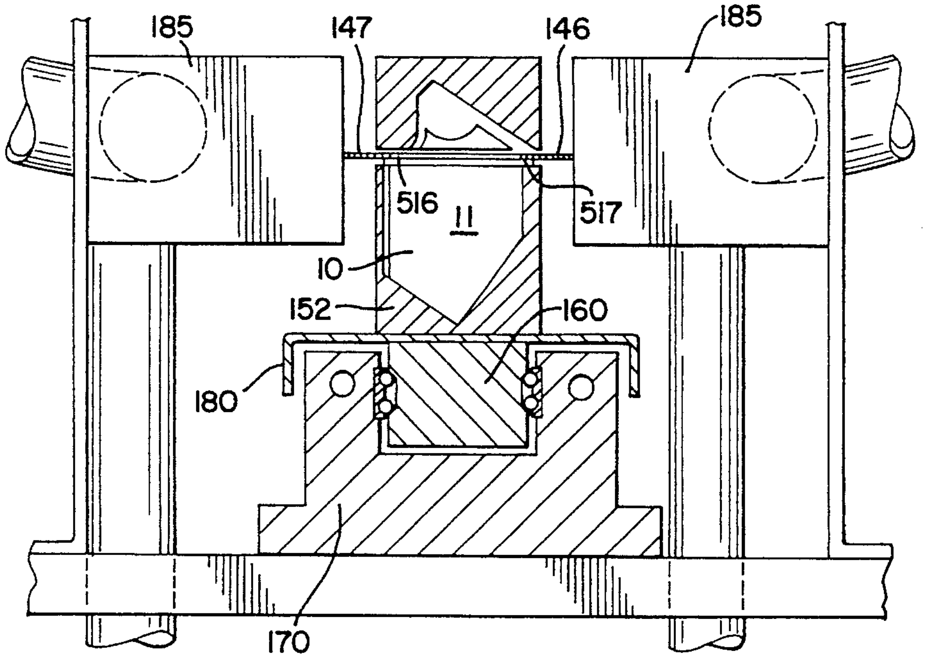
FIG. 9 is a front sectional view of a pair of spaced-apart blades cutting away the outer edges of a cartridge gasket.
Figure 8:
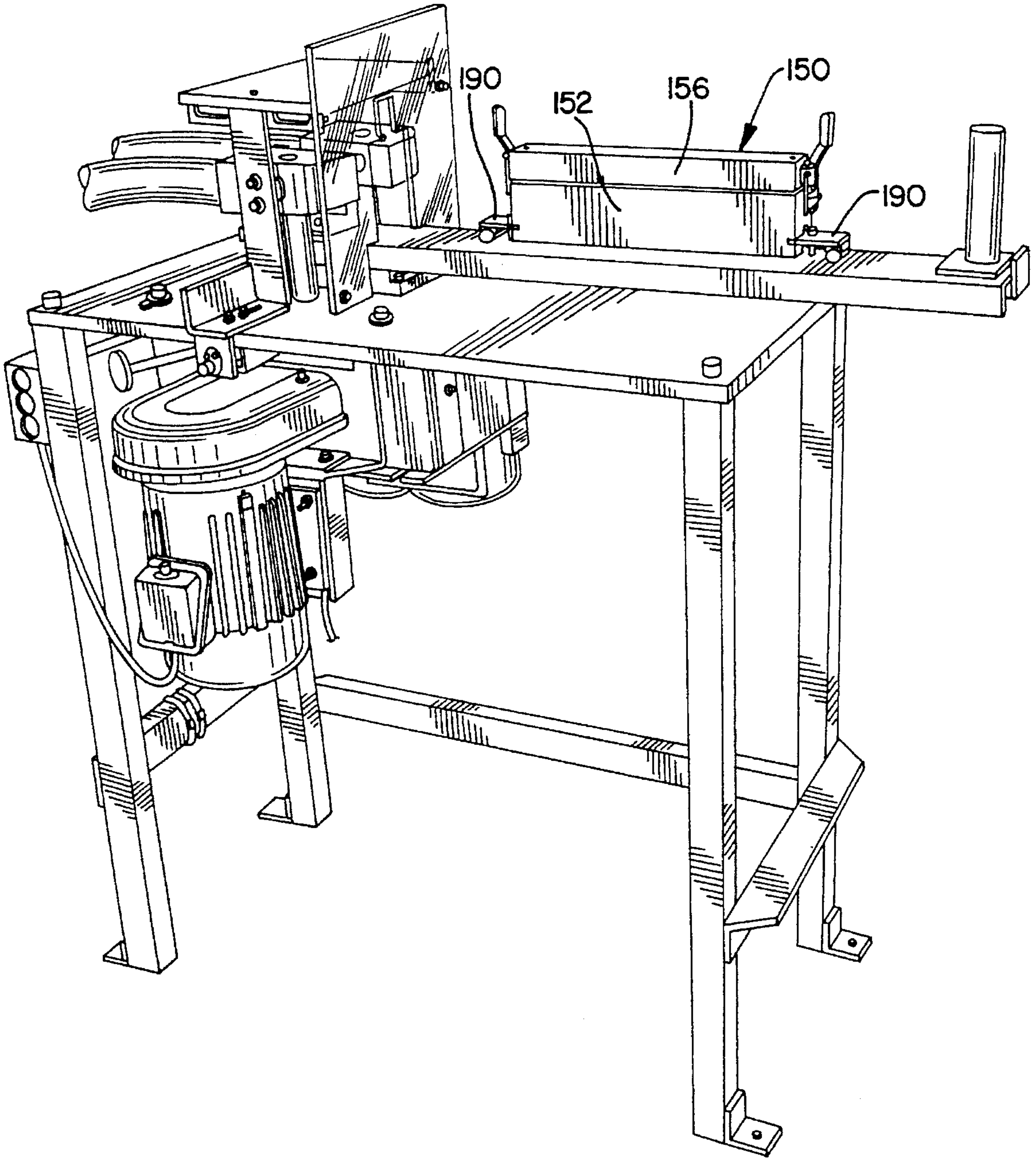
FIG. 8 is a perspective view of a container being positioned on and secured to a rail.

In the first embodiment of the separating device, subassembly 11 is placed in a movable receptacle such as cart 100 as shown in FIG. 4. In the second embodiment of the separating device, cartridge subassembly 11 is placed in a holding means such as a container 150 as shown in FIG. 7. Cart 100 and container 150 are preferably made of two portions or halves. The first or bottom half (102 or 152) is provided with walls (104 or 154) which are shaped to snugly receive hopper bin 12 and uniformly engage hopper peripheral portions 1821. Similarly, a second or top half (106 or 156) is provided with walls (108 or 158) which are shaped to snugly receive mounting member 70 and uniformly engage mounting member peripheral portions 78–81. These first (102 or 152) and second (106 or 156) halves are clamped together to securely hold subassembly 11. Hopper lengthwise outer edges 22 and 24, spacer outer edges 516 and 517, and mounting member lengthwise outer edges 82 and 84 remain exposed.

Figure 6:
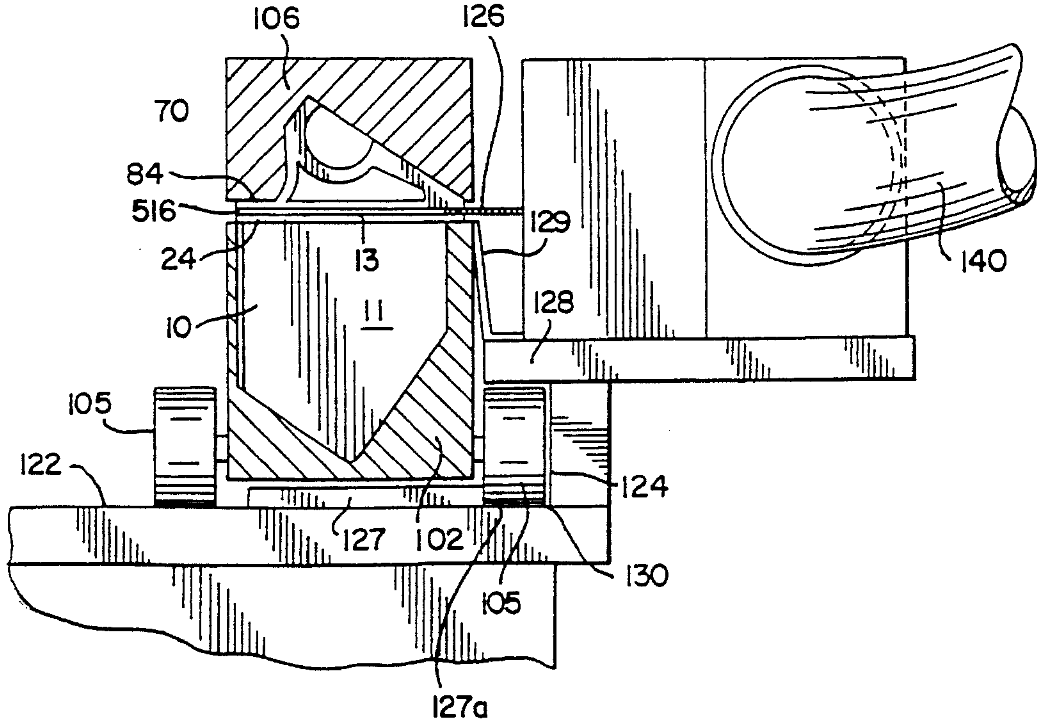
FIG. 6 is a sectional view of a table saw blade cutting the outer edge of a spacer of a subassembly.
Figure 5:
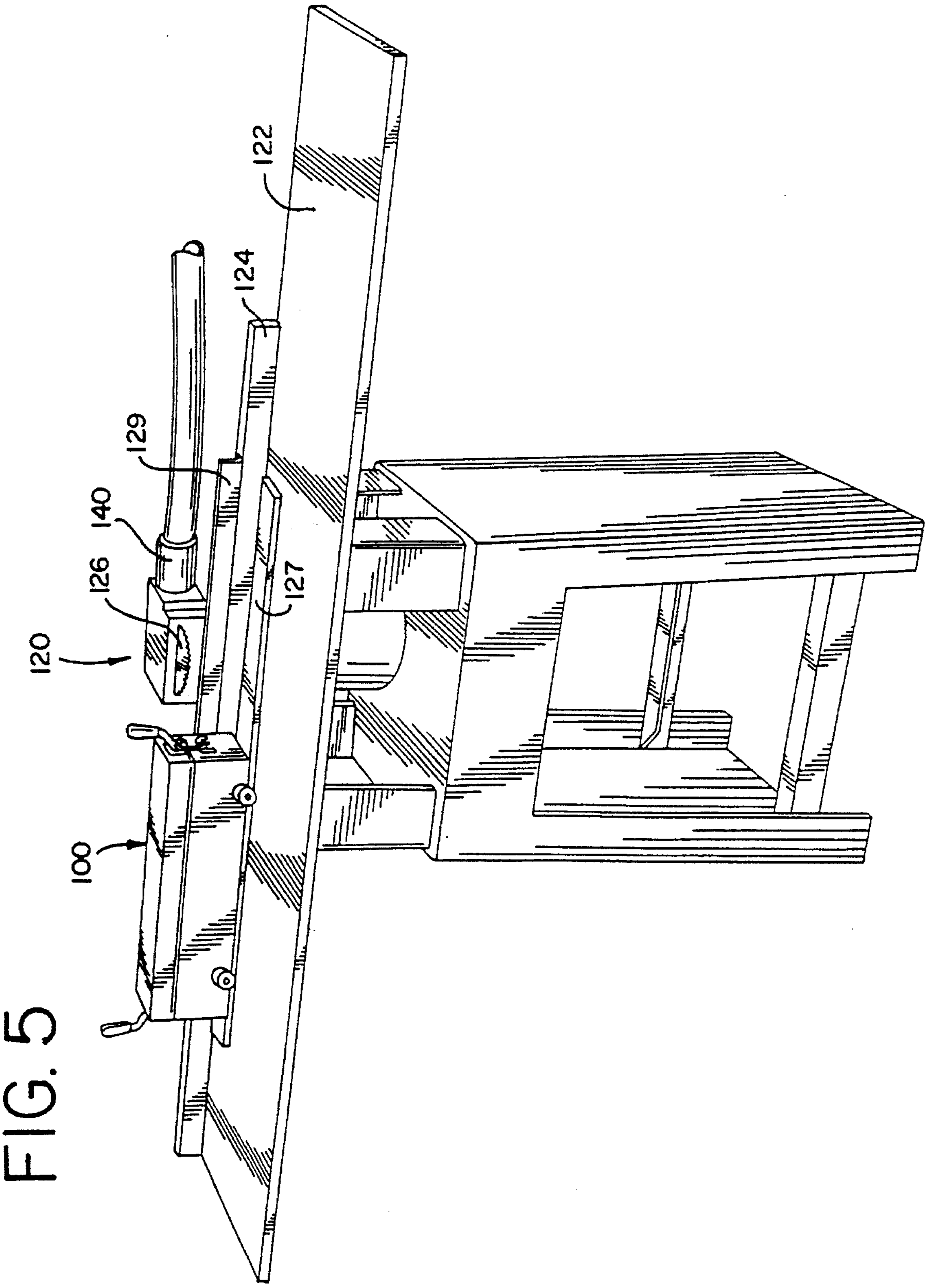
FIG. 5 is a perspective view of a subassembly contained in a cart and placed on the surface of a first embodiment of a separating device.

In the first embodiment, cart 100 is placed on a table saw 120, as shown in FIGS. 5 and 6. This table saw is preferably a typical circular saw type table saw. Table saw 120 may be purchased from Grizzley Imports of Bellingham, Wash., and modified as discussed below. Table saw 120 has a top referencing surface 122 upon which cart 100 rests, and a side positioning wall 124 from which a blade 126 projects. Cart 100 is sized to align the bottom of the blade 126 flush with the top 13 of the hopper 10. Blade 126 is preferably about 0.023 inches thick, which is substantially less than the height of the spacers 510, 511 which are approximately 1/16 inches in height. Blade 126 is also set for a cutting depth of about 3/16 which is approximately equal to the depth of the spacers 510, 511. Blade 126 cuts away or disintegrates approximately 0,023 inches of the spacer outer edge. The depth of blade 126 should not be more than 3/16 inch because unnecessary damage to pins 75 or seals 77 (shown in FIG. 2) could result.

Cart 100 is restricted to one-dimensional movement past blade 126. Cart 100 is provided with at least one guide member, such as wheels 105 for facilitating smooth, level forward movement of cart 100 over referencing surface 122. A plate 127 having an inside edge 127*a* is secured to referencing surface 122 so that the edge is a predetermined distance from side positioning wall 124. This provides a track 130 in which wheel 105 will fit and roll. Track 130 is preferably 0.002 to 0.015 inches wider than wheel 105. This relatively small clearance prevents both the binding of and the lateral movement of wheels 105 as they roll through track 130, thereby ensuring a substantially constant blade depth.

A guide bar 128 projects from table saw side positioning wall 124 and prevents undesired vertical movement of cart 100. Guide bar 128 is located just high enough above table saw surface 122 to allow wheel 105 to pass under the guide bar. A 0.002 to 0.003 inch clearance between the guide bar 128 and wheel 105 is preferred. This clearance allows wheel 105 to roll freely underneath guide bar 128, but prevents unwanted vertical movement of cart 100. Unrestricted vertical movement would cause blade 126 to move out of alignment with the top 13 of the hopper 10. Although cart 100, guide bar 128 and track 130 are preferred for aligning subassembly 11 with blade 126 and moving it across table saw surface 122, it should be understood that other means of alignment and one-directional movement are possible.

Table saw 120 is also provided with a vacuum system 140 for removing waste debris while blade 126 cuts spacers 510, 511. Vacuum system 140 prevents debris from collecting in track 130 and misaligning blade 126 with spacers 510, 511 during cutting. A flexible strip 129, such as a mylar strip, is preferably provided for engaging the side of cart 100 so that debris collects in a pocket above guide bar 128. The vacuum system 140 then removes the debris.

The height of table saw blade 126 over table saw surface 122 is preferably adjustable. There are presently several types of cartridges 5, and each cartridge has a differently shaped subassembly 11. Different carts 100 are needed to snugly hold the differently shaped subassemblies 11. Because it is difficult to manufacture different carts within the tolerances necessary to ensure proper alignment of spacers 510, 511 with table saw blade 126, it is preferred that the height of blade 126 be adjustable.

Cart 100 makes two passes by blade 126—one for each side of the cart. The first pass cuts away or disintegrates approximately 0.023 inches in height of the spacer outer edge 516 and cuts approximately the entire depth of the spacer 510 (i.e., approximately 3/16 inches). The cart is then turned 180° and a second pass is performed. This pass cuts away or disintegrates approximately 0.023 inches in height of the spacer outer edge 517 and cuts approximately the entire depth of the spacer 511 (once again, 3/16 inches). Both cuts should be made flush with the top 13 of the toner hopper 10. Thus, the hopper 10 and mounting member 70 should be separated from one another. If the hopper 10 and mounting member 70 are not completely separated, they may be manually pried apart by a worker as the majority of the connection between the hopper 10 and mounting member 70 has been removed.

Although the first embodiment has been shown and described to include only a single blade 126, it should be understood that the device may include two spaced-apart blades. Blade 126 would cut away spacer 510 while a second blade (not shown) would cut away spacer 511 in a single pass.

In the second embodiment of the separating device (FIGS. 7–12), container 150 is positioned on and secured to a rail 160. The rail 160 is mounted in a linear bearing 170 that only permits linear movement of the rail up and down the length of the bearing. A dust cover 180 and vacuum system 185 may be provided to cover the rail 160 and bearing 170 to prevent dust and waste debris from jamming the rail and bearing union.

Two "L-shaped" brackets 190 are used to position container 150 on rail 160. The bottom half 152 of each end of container 150 is provided with a slot 155. One end 192 of each bracket 190 engages one of the slots 155. A second end 194 of each bracket 190 engages a surface of the dust cover 180 or rail 160. A hole (not shown) is provided through the rail 160, dust cover 180 and bracket 190 for receiving a bolt 196. When container 150 is correctly positioned on rail 160, bolts 196 are tightened to secure container 150 to rail 160.

Linear bearing 170 is secured to a surface of the separating device so that rail 160 is aligned between and substantially parallel to the surfaces of a pair of blades 146 and 147. Blades 146, 147 are positioned to cut the spacers 510, 511 along their outer edges 516, 517 to a depth of approximately 3/16 inches. Blades 146, 147 are also aligned so that the cut is made flush with the top 13 of the toner hopper 10.

Figure 10:
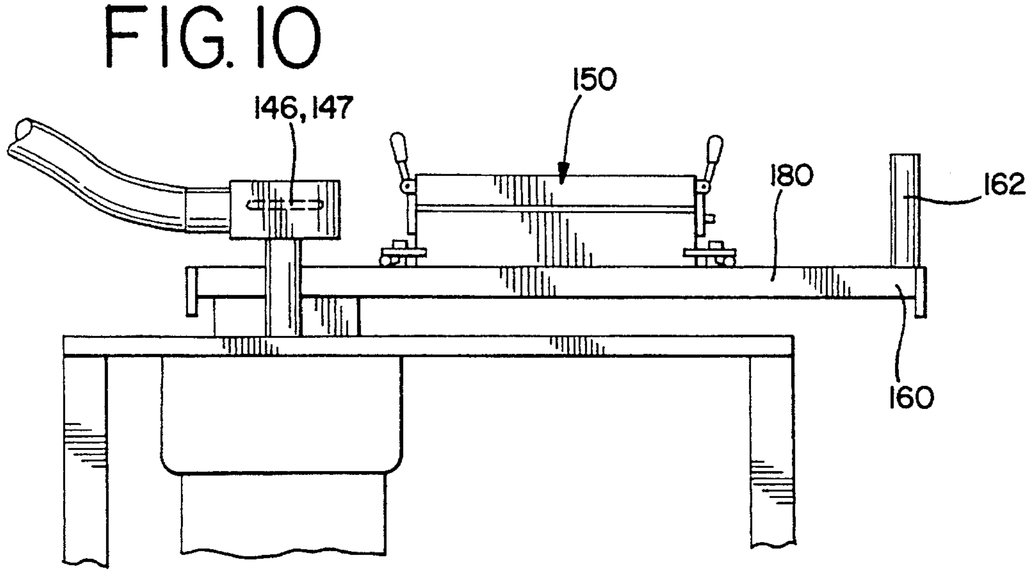
FIG. 10 is a side view of a container secured to a rail prior to moving past the blades of the device.
Figure 11:
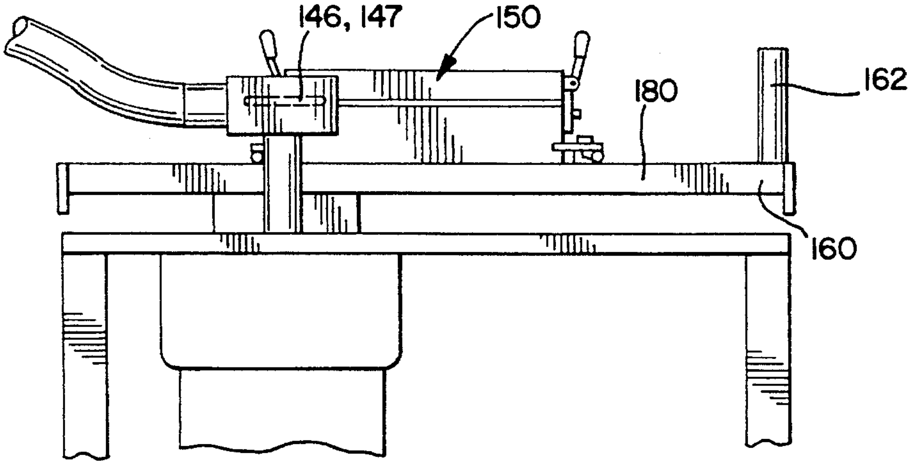
FIG. 11 is a side view of a container secured to a rail while moving past the blades of the device.
Figure 12:
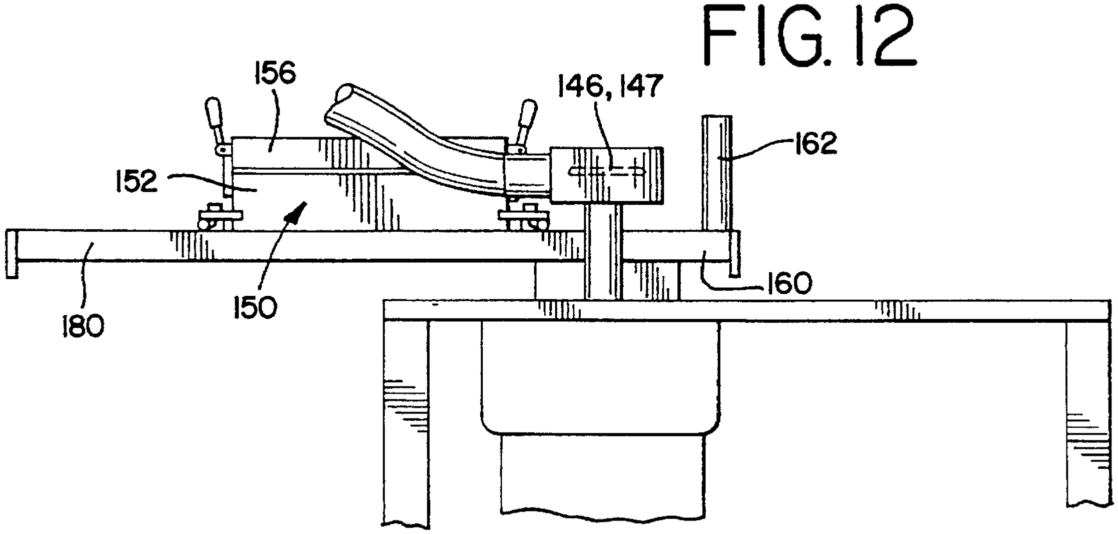
FIG. 12 is a side view of a container secured to a rail after moving past the blades of the device.

Rail 160 is pulled away from blades 146 and 147 when container 150 is secured to the rail as shown in FIG. 10. Once secured, an operator grasps handle 162 and moves rail 160 and container 150 linearly along bearing 170 and past blades 146 and 147. (See FIGS. 11 and 12). The operator then pulls the rail back to its original position. This single pass separates the mounting member 70 from the toner hopper 10.

The operator now releases the top half 156 of container 150 from the bottom half 152 and removes cartridge 11. Adjustments can be made to the height of the blades 146 and 147 and/or the position of container 150 on rail 160 to prevent damage to the peripheral portions 18–21 of the hopper 10 and the peripheral portions 78–81 of the mounting member 70, and to ensure that the spacers 510, 511 are cut to the desired predetermined depths. Another similar cartridge 11 can then be placed in container 150 without loosening bolts 196 and repositioning the bottom half 152 of the container on rail 160.

Although the described separating devices are preferred for holding, aligning and moving cartridge subassembly 11 linearly past blade 126 or 146 and 147, it should be understood that other holding, aligning and linear moving means are possible. In addition, although separating devices have been shown and described to have a cutting means such as blades 126 or 146 and 147, it should be understood that other means for removing the outer edges 516, 517 of the spacers 510, 511, such as by melting or otherwise disintegrating the outer edges 516, 517, are possible.

As best shown in FIG. 13 in either embodiment of the device, ideally, no portion of the spacers 510, 511 should remain attached to the hopper 10; however, it is recognized that a negligible portion may remain. On the other hand, nearly 0.039 inch thick residual portions 800, 801 of the spacers 510, 511 remain attached to the mounting member 70. The residual portions 800, 801 provide clearance between the seal member 250 and the foam seals 77 upon resealing the cartridge subassembly as discussed more fully below.

Hopper 10 is then placed in holding container 850 as shown in FIG. 14. Holding container 850 is shaped to snugly and uniformly engage hopper peripheral portions 18–21. As shown in FIG. 15, plane 860 is be used to scrape away any residual material left on hopper peripheral portions 18–21. Residual material could be any remaining fragments of spacers 510, 511. Hopper 10 is preferably left in holding container 850 and mounting member 70 is preferably left in cart to 120 or container 150 during this scraping process.

The next step is to clean hopper 10 and mounting member 70 of any toner remaining on their surfaces or in bin 12. The cleaning step is preferably done by vacuuming and/or blowing high pressure air over the surface of hopper 10 and mounting member 70.

Figure 16:
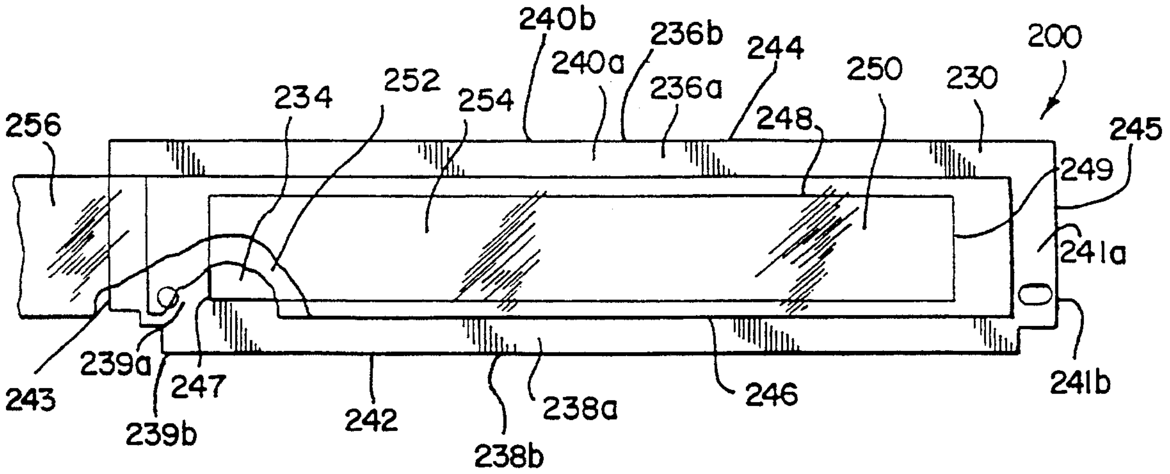
FIG. 16 is a plan view of one embodiment of the seal assembly.
Figure 17:
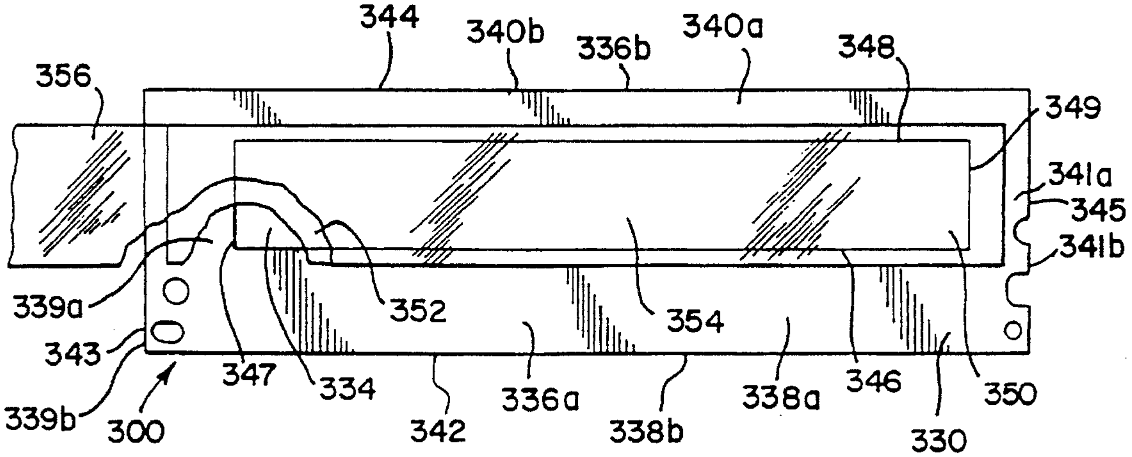
FIG. 17 is a plan view of a second embodiment of the seal assembly.

Subassembly 11 is now reconditioned and ready for resealing. To do this, a new seal assembly 200 or 300 (FIGS. 16 and 17) is secured between hopper 10 and mounting member 70. Seal assemblies 200 and 300 are functionally similar but are shaped differently because each is used in a different type of toner cartridge 5. Because seal assemblies 200 and 300 are functionally the same, the following discussion is directed toward seal assembly 200 only, although the discussion applies to seal assembly 300 as well.

In the preferred embodiment, seal assembly 200 comprises a gasket 230 and a removable seal member 250. Gasket 230 has a top surface area **236*a* comprised of surfaces 238*a*–241*a*, and a bottom surface area 236*b* comprised of surfaces 238*b*–241*b*. Top and bottom surface areas 236*a* and 236*b* are defined by outer edges 242–245, and inner edges 246–249. Bottom surface area 236*b* is preferably flat and shaped to engage hopper peripheral portions 18–21. Top surface area 236*a* is also preferably flat and shaped to engage mounting member peripheral portions 78–81. Lengthwise outer edges 242 and 244 of gasket 230 are preferably flush with hopper outer edges 22 and 24. Gasket inner edges 246–249 may extend beyond hopper inner edges 26–29 and define a gasket opening 234. However, gasket inner edges 246–249** should permit toner to flow across the entire surface of the magnetic roller (not shown) and drum (not shown).

Removable seal member 250 is wider than gasket opening 234 but not as wide as gasket 230. Seal member 250 can be divided into first 252 and second 254 portions that together are more than twice the length of gasket opening 234. The first portion 252 is placed over gasket top surface area **236*a* and secured to the inner edges 246–249 of gasket top surfaces 238*a*–241*a*, thereby sealing gasket opening 234. The second portion 254 is slightly longer than first portion 252, and is folded over first portion 252 so that a tab 256 extends beyond gasket outer edge 243. By pulling tab 256, an operator can remove releasable seal member 250 from the gasket 230, thereby allowing toner to flow through gasket opening 234**.

In the preferred embodiment, gasket 230 is a 0.020 inch thick, high impact polystyrene stamping, and seal member 250 is a 0,005 inch thick laminate film. Both components are manufactured by Transilwrap Company, Inc., Northlake, Ill. 60164. In the preferred embodiment, gasket 230 is a screen grade with no corona treatment and has a white opaque finish. Seal member 250 is a (75/125) clear MR transkote.

A releasable heat activated resin is preferably used to secure seal member 250 to gasket 230. The heat activated resin is preferably applied to the periphery of seal member 250 and can be purchased from Transilwrap already applied. Seal member 250 is then positioned over gasket top surface **236*a* and placed on a heat platen (not shown) set at about 197° F. to 227° F. Seal assembly 200 is left in the heat platen for approximately six seconds at approximately 85 pounds per square inch of pressure. This forms the removable seal between gasket 230 and seal member 250**.

Figure 19:
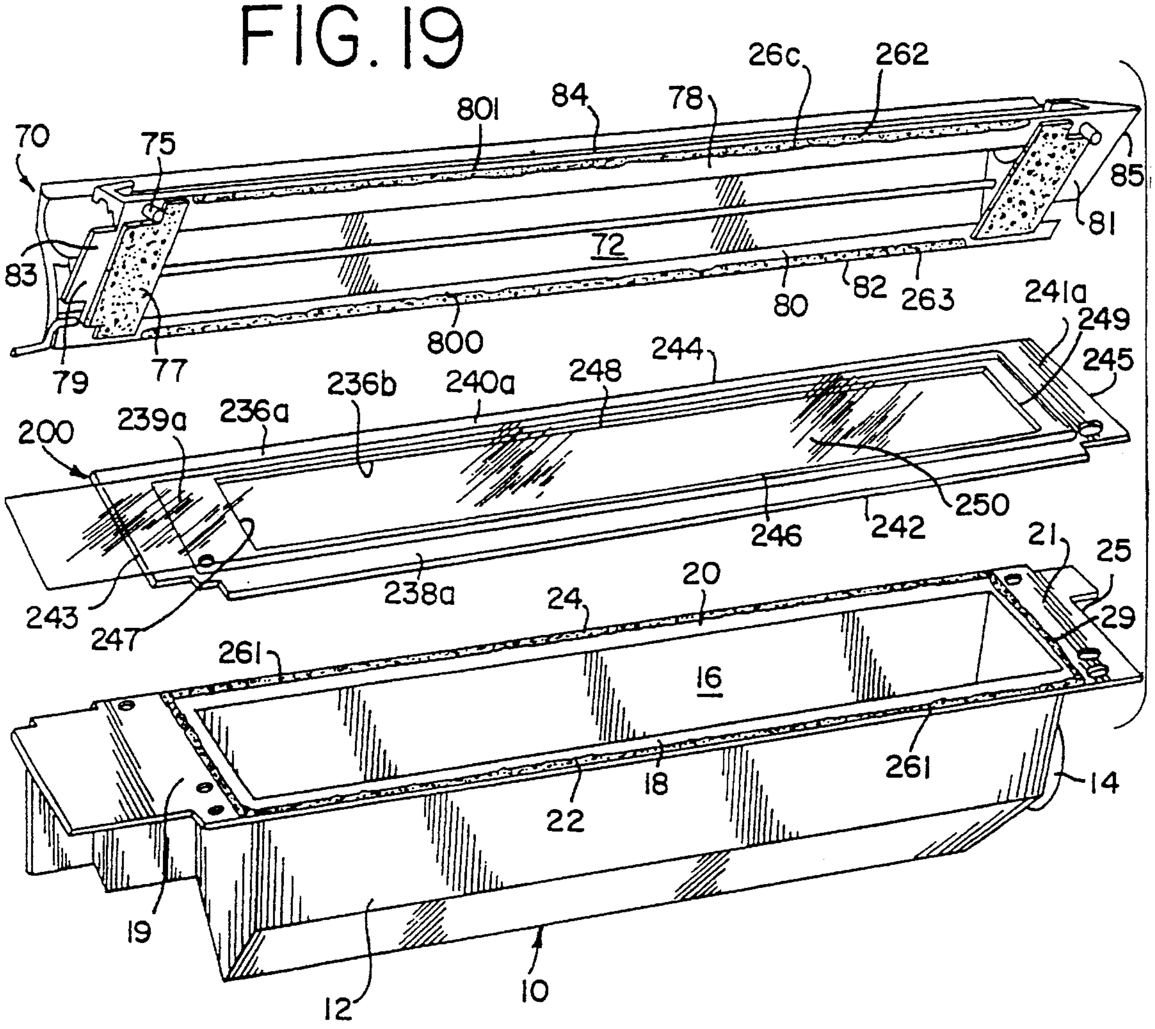
FIG. 19 is an exploded view of the hopper, new seal assembly and mounting member with beads of glue applied to the appropriate surfaces of the hopper and mounting member; and, FIG. 20 is a schematic representation of a perspective view of a stepped gasket.

Seal assembly 200 is secured to hopper 10 and seals hopper discharge opening 16. For ease of application, a foot operated type glue gun (not shown) is used to apply a first bead of glue 261 (see FIG. 19) on hopper peripheral portions 18–21. Care should be taken to apply glue bead 261 along gasket lengthwise outer edges 22 and 24. Gasket bottom surface area **236*b* is then placed atop this first glue bead 261**.

A second 262 and a third 263 bead of glue are applied to the residual portions 800, 801 of the spacers 510, 511 which have remained ultrasonically welded to the bottom of mounting member peripheral portions 80 and 78 respectively. The lengthwise outer edges 242 and 244 of gasket top surface **236*a* are then placed over the second and third glue beads. Glue beads 261, 262 and 263** are preferably a styrene based type glue having a holding strength of about 2900 psi at room temperature. This type of glue can be purchased from Eclectic Products, Inc., of Carson, Calif. 90745, under the name E-6000 (clear). However, it should be understood that other types of glues, adhesives or resins may be used.

The residual portions 800, 801 of the spacer provide clearance between the foam seals 77 and the seal member 250 to prevent tearing of the seal member 250 due to excessive friction between the foam seals 77 and the seal member 250 when the seal member 250 is being removed.

Figure 18:
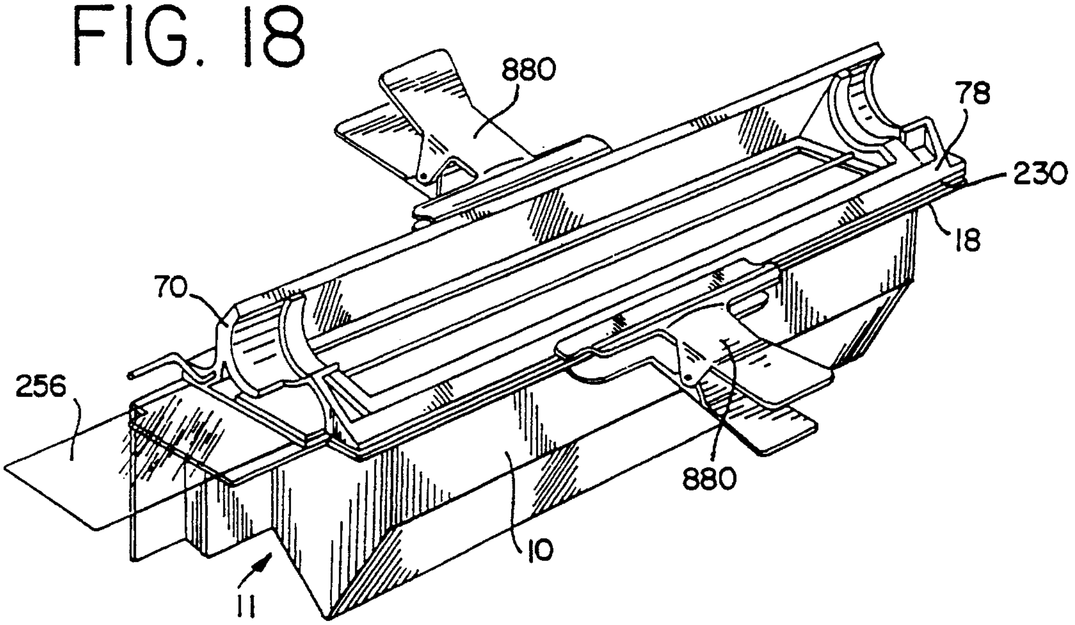
FIG. 18 is a perspective view of the hopper, new seal assembly and mounting member clamped together.

Finally, clamps 880 are used to clamp hopper peripheral portions 18 and 20 and mounting member peripheral portions 78 and 80 together as shown in FIG. 18. Clamps 880 are left in place until all three glue beads 261, 262 and 263 are substantially dry (see FIG. 19).

Subassembly 11 is now reconditioned and resealed, and can be reconnected to the other components of cartridge 5 and refilled with toner. Seal assembly 200 forms a reliable seal over hopper discharge opening 16 so that toner will not leak out of hopper bin 12 during shipping and handling.

Figure 20:
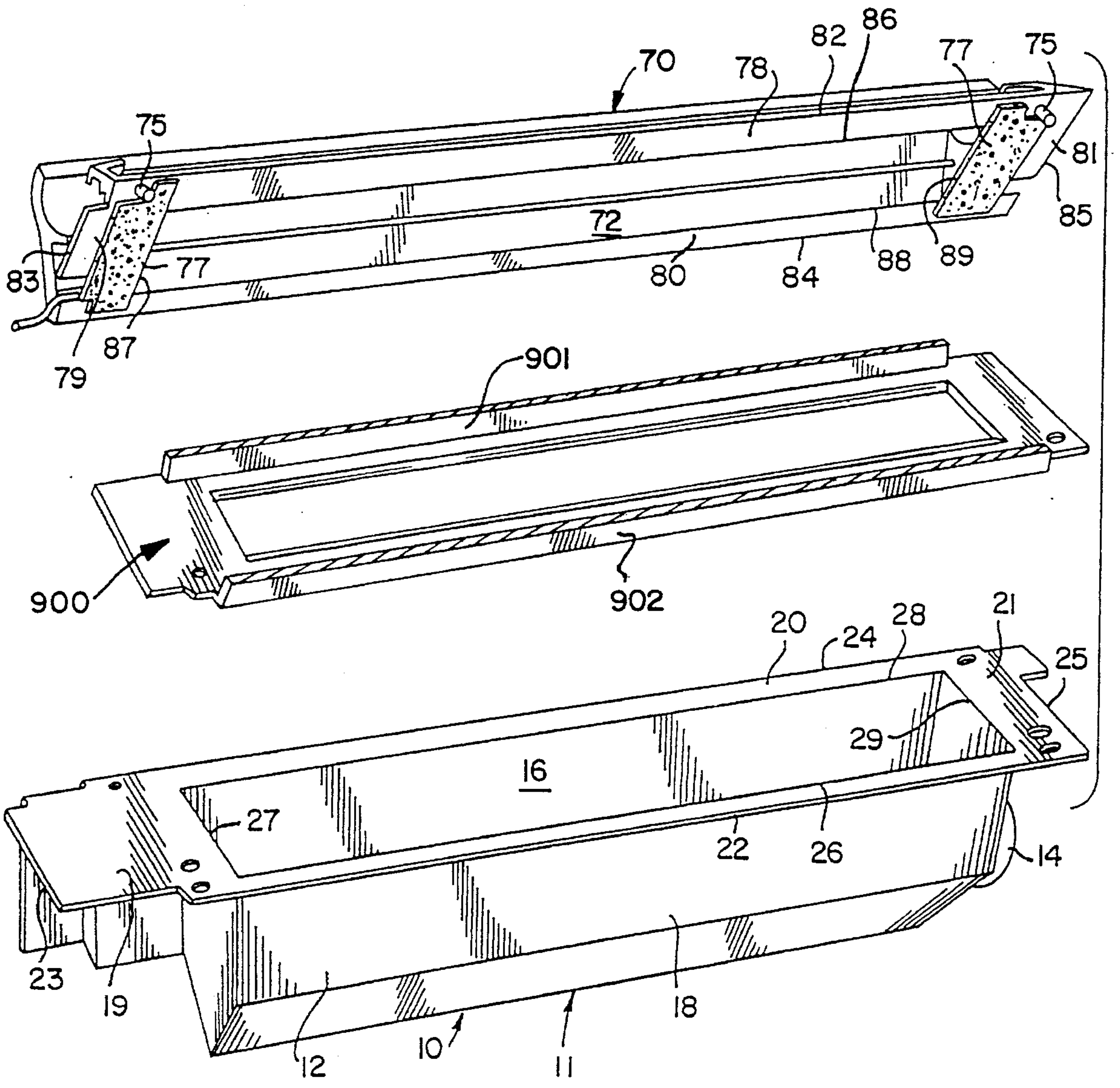

Although the preferred embodiment describes a blade having a thickness of 0.023 inches which then leaves residual portions 800, 801 attached to the mounting member 70, it should be understood that thicker blades may be used as long as the seal assembly (200 or 300) provides for a stepped gasket 900 (see FIG. 20) to give the seal member 250 clearance from the foam seal 77. For example, if blade thickness was chosen to be 1/16 of an inch and the spacers 510, 511 were removed in their entirety, a stepped gasket 900 would have to be provided to allow clearance between the foam seal 77 and the seal member 250. In this situation, stepped portions 901, 902 should preferably be between 0.030 and 0.040 inches high.

It will be understood that the inventions may be embodied in other specific forms without departing from the spirit or central characteristics thereof. The present examples and embodiments, therefore, are to be considered in all respects as illustrative and not restrictive, and the inventions are not to be limited to the details given herein.

I claim:

1. A method for reconditioning and resealing a toner cartridge comprising the steps of:

providing a toner cartridge having a toner cartridge subassembly, the subassembly having a toner hopper, a mounting member, and spacers, the toner hopper having a top and a discharge opening, the spacers being integral with the top of the toner hopper, and the mounting member being connected to the spacers;

separating the toner cartridge by cutting the spacers flush with the top of the toner hopper; and, securing a new seal assembly to the toner hopper and mounting member, said new seal assembly covering said hopper discharge opening.

2. The method of claim 1, wherein the step of securing a new seal assembly includes securing a new removable seal member and a new gasket having a gasket opening, the new removable seal member being attached to the new gasket and covering the gasket opening.

3. The method of claim 1, wherein the step of separating includes using a table saw blade to cut the spacers flush with the top of the toner hopper.

4. The method of claim 3, wherein the spacers have a predetermined height and the table saw blade has a predetermined thickness such that enough of a residual portion of the spacers is left attached to the mounting member to provide clearance between the seal member and a seal.

5. The method of claim 4, wherein the table saw blade has a thickness of approximately 0.023 inches.

6. The method of claim 5, wherein the spacers have a height of approximately 1/16 inches.

7. The method of claim 6, wherein the residual portion has a thickness of approximately 0.035 inches.

8. The method of claim 7, wherein the new seal assembly is comprised of a new removable seal member and a new gasket having a gasket opening, the new removable seal member being attached to the new gasket and covering the gasket opening.

9. The method of claim 8, wherein glue is used to secure said new gasket to said hopper and said mounting member.

10. The method of claim 9, wherein a heat activated resin is used to attach said new removable seal member to said new gasket.

11. The method of claim 3, wherein the blade has a thickness approximately equal to the thickness of the spacer such that the nearly the entire spacer is removed.

12. The method of claim 11, wherein the new gasket is a stepped gasket.

13. The method of claim 12, wherein the blade has a thickness of approximately 1/16 inches.

14. The method of claim 3, wherein said table saw blade has a blade depth of about 3/16 inch.

* * * * *